Jan. 15, 1935.  W. B. SUTHERLAND  1,987,875
BRAKE SHOE
Filed Aug. 19, 1933   3 Sheets-Sheet 1
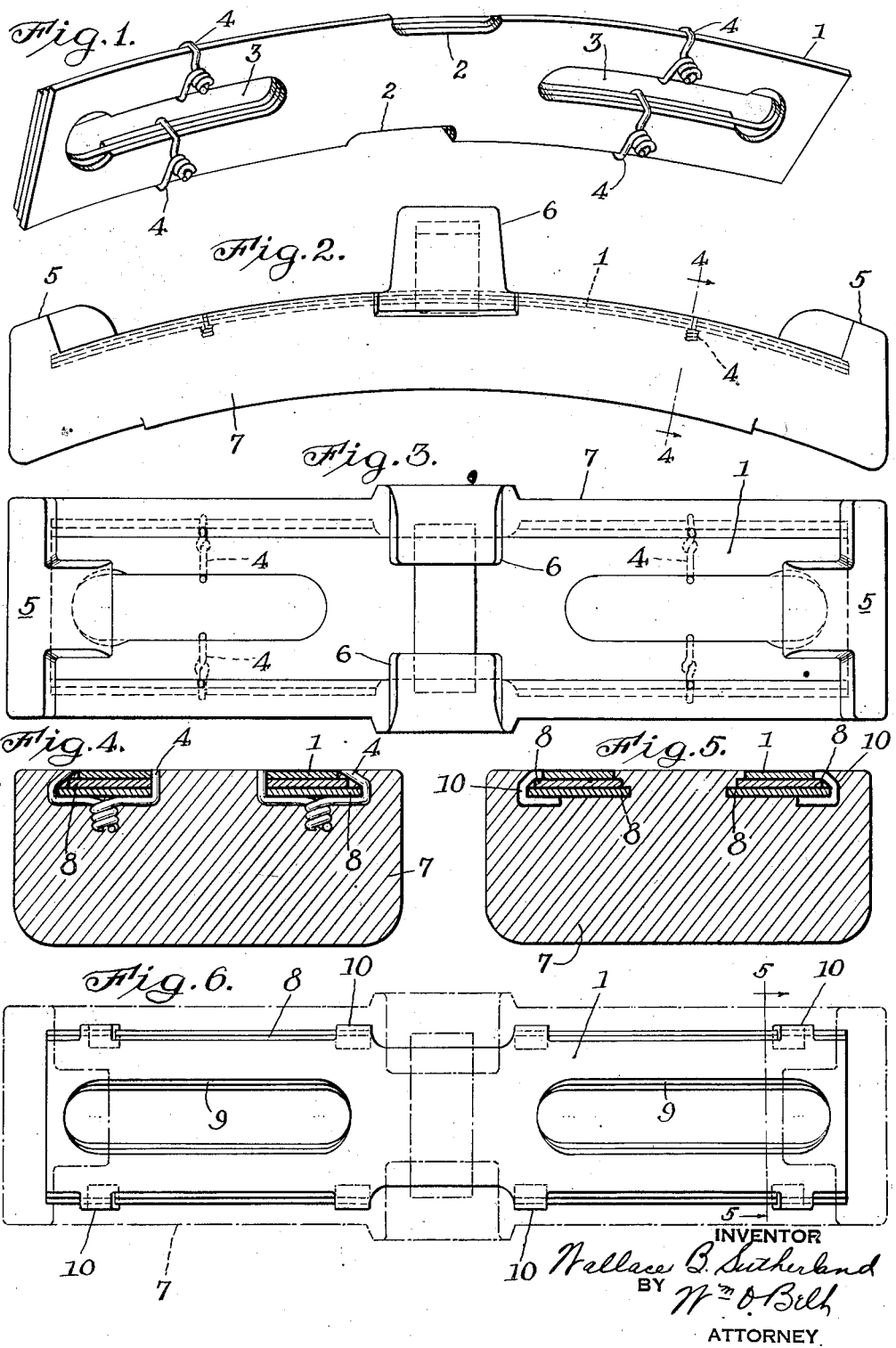

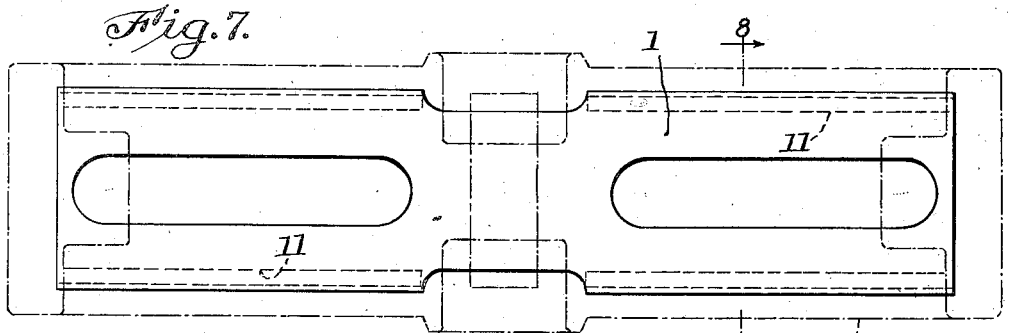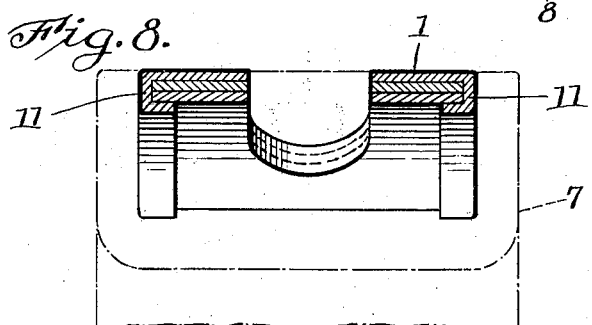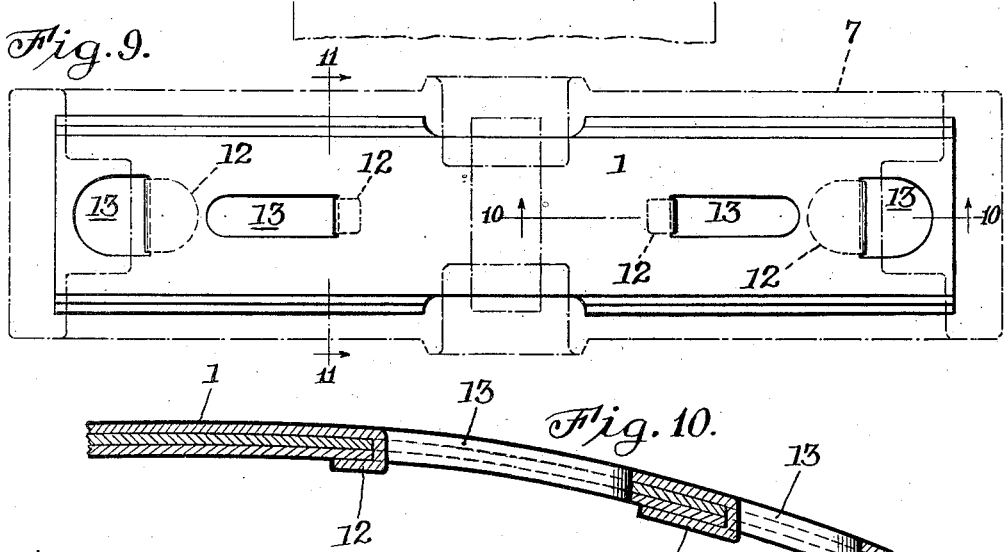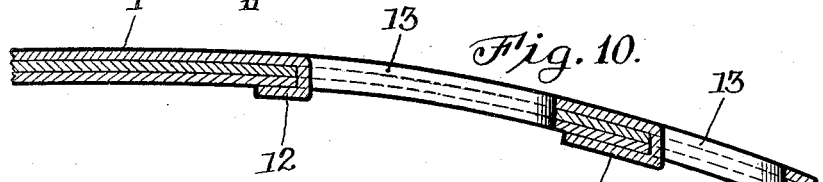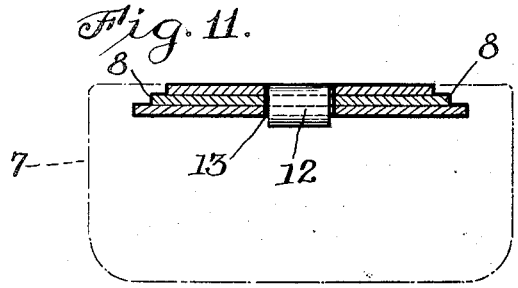

Jan. 15, 1935.  W. B. SUTHERLAND  1,987,875
BRAKE SHOE
Filed Aug. 19, 1933   3 Sheets-Sheet 3

INVENTOR.
Wallace B. Sutherland
BY Wm O Bell
ATTORNEY.

Patented Jan. 15, 1935

1,987,875

UNITED STATES PATENT OFFICE 1,987,875

BRAKE SHOE

Wallace B. Sutherland, Suffern, N. Y., assignor to The American Brake Shoe and Foundry Company, Wilmington, Del., a corporation of Delaware Application August 19, 1933, Serial No. 685,883

12 Claims. (Cl. 188—258)

This invention relates to brake shoes and its object is to provide a reenforce back for the shoe which will hold the parts of the body together when fractured and resist the fatigue of vibration and other destructive effects of service so that the fractured body may continue in use and give efficient service until it has reached its predetermined limit of wear.

Another object of the invention is to provide a novel reenforce back comprising a plurality of parts which are capable of limited relative movement to give the back a flexible quality which distinguishes it from a solid rigid back and materially prolongs its life under service conditions so that it will hold the parts of a broken body together until they have reached the limit of wear.

And a further object of the invention is to provide a reenforce back comprising a plurality of laminated strips which are capable of limited relative movement one upon the other resulting in prolonging the life and effectiveness of the back for holding the parts of a broken body together and in service until they are worn out.

In the accompanying drawings I have illustrated selected embodiments of the invention and referring thereto, Fig. 1 is a perspective view of a reenforce back showing one form of the invention.

Fig. 2 is a side elevation of a shoe with the back of Fig. 1 embedded therein.

Fig. 3 is a top plan view of the shoe shown in Fig. 2.

Fig. 4 is a sectional view on the line 4—4 of Fig. 2.

Fig. 5 is a sectional view on the line 5—5 of Fig. 6.

Fig. 6 is a view similar to Fig. 3 but showing the reenforce illustrated in Fig. 5.

Fig. 7 is also a plan view of a shoe showing another form of the reenforce.

Fig. 8 is a sectional view on the line 8—8 of Fig. 7.

Fig. 9 is a plan view of a shoe showing another form of the reenforce.

Fig. 10 is an enlarged sectional view on the line 10—10 of Fig. 9.

Fig. 11 is a transverse sectional view on the line 11—11 of Fig. 9.

Figure 12:
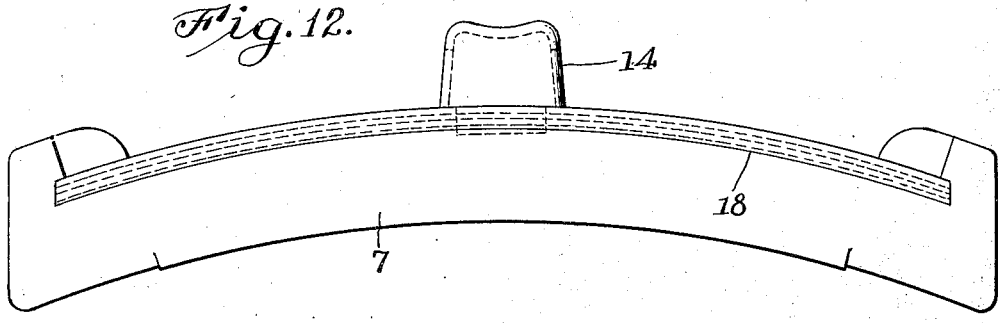
Fig. 12 is a side elevation of a brake shoe showing another embodiment of the reenforce back according to my invention.
Figure 13:
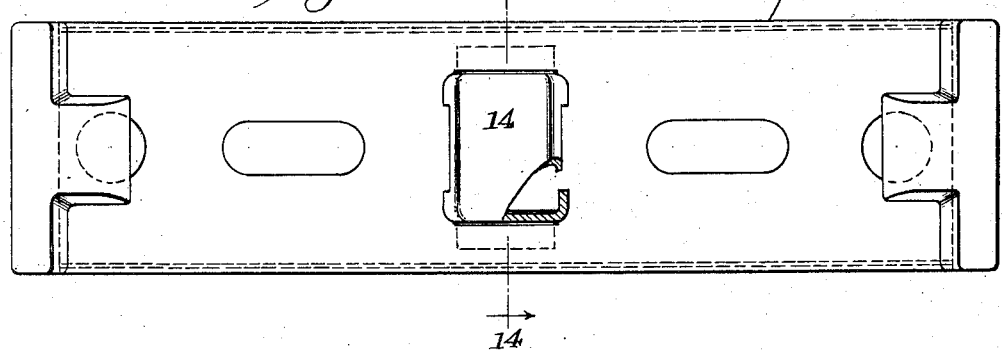
Fig. 13 is a plan view partly broken away and in section of the shoe shown in Fig. 12.

Referring to the drawings, the reenforce back 1 in all forms comprises a plurality of metal strips arranged in laminations one upon the other and capable of limited relative movement. The strips may be made in the form of single plate backs as heretofore used in brake shoes and provided with side recesses 2 and elongated openings 3. The particular design of the strips may be varied as desired for different brake shoes and to satisfy different conditions.

Figure 14:
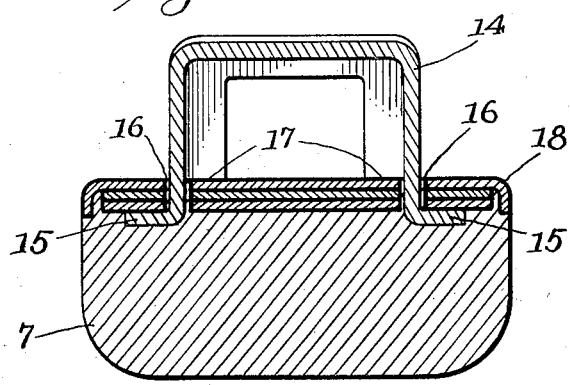
Fig. 14 is a transverse sectional view on the line 14—14 of Fig. 13.

I prefer to employ at least three strips in the reenforce back and, in order to hold them assembled one upon the other as a unit for placement in the mold for casting the brake shoe body with the back embedded therein, I may fasten the strips together by a plurality of wire ties 4, Fig. 1. These ties may be burned by the hot body metal in casting the shoe but to insure release of the strips so that they will be free for limited relative movement, I may grind the shoe at the back thereof to remove a part of the ties as shown in Fig. 4. The strips are of suitable length to be anchored in the shoe beneath the end lugs 5, Figs. 2, 3, and they are also held in place beneath the attaching lug 6. It is preferred that the strips be coated with silica flour or other suitable refractory to protect them against burning and to prevent the strips from fusing together during the casting operation, so that they will be free to move relatively one upon the other while they are securely anchored in the body 7 of the shoe. The strips may be made of different widths and correctly registered to provide the reenforce with stepped outer edges 8, Figs. 4, 7, and the edges of the openings in the back may be stepped as shown at 9, Figs. 5, 6, if desired so that the body metal will make effective interlocking engagement with the stepped edges to anchor the back in the body. Instead of the wire ties 4, one of the strips, as the outer strip, of the reenforce back may be provided with integral ties 10 in the form of lips which are bent over the outer edges of the other strips of the back to hold them in assembled position, Figs. 5, 6; or one of the strips, as the outer strip, of the back may be provided with flanges 11 at its edges which are bent over the edges of the other strips to hold the strips assembled, as shown in Figs. 7, 8; or one of the strips, as the outer strip, may be provided with the lips 12 which are bent through the openings 13 in the strips and over the edges of the other strips to hold them assembled, as shown in Figs. 9, 11. The attaching lug may be utilized for holding the strips of the back assembled, as shown in Figs. 12, 14, in which the lug 14 has legs 15 which project through openings 16 in the strips and are bent laterally under the back in interlocking engagement therewith. The lug has shoulders 17 which engage the outer face of the back and these shoulders, in cooperation with the bent legs of the lug, retain the strips in assembled relation to form the back. The outer strip 18 may be made in channel form if desired, Fig. 14.

The back should be securely anchored with the body but the strips should be relatively movable one upon the other so that when the body fractures in service the back will hold the parts thereof together and will have a certain degree of flexibility which will prolong the life of the back until the body is worn out. The fastening devices, whether in the form of ties or flanges or lips or other devices, are not intended to hold the strips so tightly together that they cannot move to a limited extent one upon the other, but are only employed to hold the strips together in an assembled unit for handling and the casting operation and they may be broken, if they are not burned out in the casting operation, to release the strips where this is possible and as before stated in connection with the ties 4. Each strip may be thinner than the strips heretofore employed in reenforce backs because the plurality of strips affords the strength required and it has been found that a comparatively thin flexible back has longer life than a thicker rigid back because it is not so quickly damaged by vibration and other destructive effects of service.

The laminated back of my invention can be made of light gage metal and in any desired size and shape to suit different types of brake shoes. The strips should not be fused or otherwise locked together in the shoe but they should be capable of limited relative movement to provide a degree of flexibility which retards the effect of vibration and other causes which result in breaking the back and rendering the shoe unfit for further service. When the body of a shoe is broken and the shoe is subjected to vibration, the inner strip will be in tension, the outer strip will be in compression and the middle strip substantially neutral and, in a destructive vibration test to which a shoe embodying my invention has been subjected, the inner strip failed first, then the outer strip and finally the middle strip. This test also demonstrated that the back would last until the body of the shoe had worn out so that the full value of the shoe for commercial purposes would be obtained notwithstanding the body was fractured early in service.

I have shown the invention embodied in several forms in a common cast iron car shoe but I reserve the right to make any changes therein to adapt the invention for other shoes or for other reasons within the scope of the following claims:

I claim:

1. A brake shoe comprising a body and a reenforce back embedded therein, said back comprising a plurality of laminated strips.

2. A brake shoe comprising a body and a reenforce back embedded therein, said back comprising a plurality of laminated strips, and means holding said strips in assembled relation.

3. A brake shoe comprising a body and a reenforce back embedded therein, said back comprising a plurality of laminated strips and means for holding the strips together, said means retaining the strips assembled in a unit for placement in a mold wherein the body is cast on the unit but not preventing limited relative movement of the strips one upon the other in commercial use of the shoe.

4. A brake shoe comprising a body and a reenforce back embedded therein, said back comprising a plurality of laminated strips of varying widths.

5. A brake shoe comprising a body and a reenforce back embedded therein, said back comprising a plurality of laminated strips decreasing in width from the inner strip to the outer strip.

6. A brake shoe comprising a body and a reenforce back embedded therein, said back comprising a plurality of laminated strips and having stepped outer edges.

7. A brake shoe comprising a body and a reenforce back embedded therein, said back having openings therein and the edges of said openings being stepped.

8. A brake shoe comprising a body and a reenforce back embedded therein, said back having openings therein and marginal edges of the back and edges of the openings being stepped.

9. A brake shoe comprising a body and a reenforce back embedded therein, said back comprising a plurality of laminated strips, one of said strips having fastening means for retaining the other strips in assembled relation therewith.

10. A reenforce back for a brake shoe comprising a plurality of laminated strips and means holding said strips together in an assembled unit but not so tightly as to prevent limited relative movement of the strips when embedded in a brake shoe.

11. A brake shoe comprising a body and a reenforce back embedded therein, said back having stepped outer edges.

12. A brake shoe comprising a body and a reenforce back embedded therein, said back comprising a plurality of strips which are capable of limited relative movement one upon the other.

WALLACE B. SUTHERLAND.